Patented Dec. 4, 1934

1,982,739

UNITED STATES PATENT OFFICE 1,982,739

MOTION PICTURE APPARATUS

Willy Kaden and Ferdinand Stiefenhofer, Munich, Germany, assignors to Agfa Ansco Corporation, Binghamton, N. Y., a corporation of New York Application May 28, 1932, Serial No. 614,210
In Germany June 5, 1931

5 Claims. (Cl. 88—17)

Our present invention relates to motion picture projectors.

Its chief object is an improved driving mechanism for the said apparatus. Further objects will appear from the detailed specification following hereafter.

The source of power and the driving mechanism of cinematographic projectors are connected either rigidly or by friction. In the latter case it is known to provide fixed friction wheels between the source of power, for instance, an electric motor, and the main shaft of the cinematographic projector. Moreover it has been proposed to connect a pulley, driven by the source of power, with a member of the cinematographic projector by means of a twisted belt. This member is mostly the rotating shutter constructed in form of a pulley.

Contrary to these known arrangements, according to this invention the source of power is connected with the shutter roller by a friction roller which can be brought in and out of cooperation. With a particularly serviceable construction which consists in intercalating a further friction wheel between the source of power and the driving mechanism, it is not only possible to set the shutter and the film advancing means out of motion at predetermined times, but also to change the direction of rotation of the running shutter.

Figure 1:
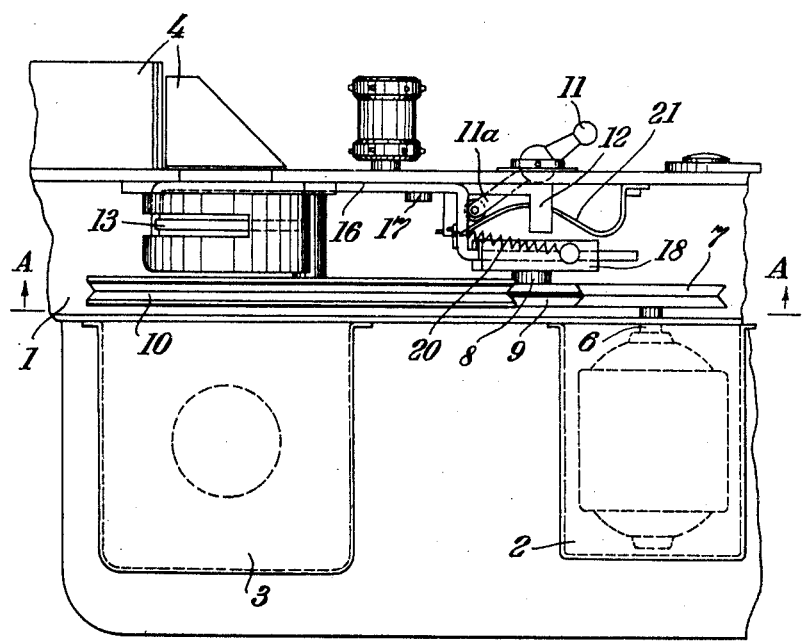
Figure 2:
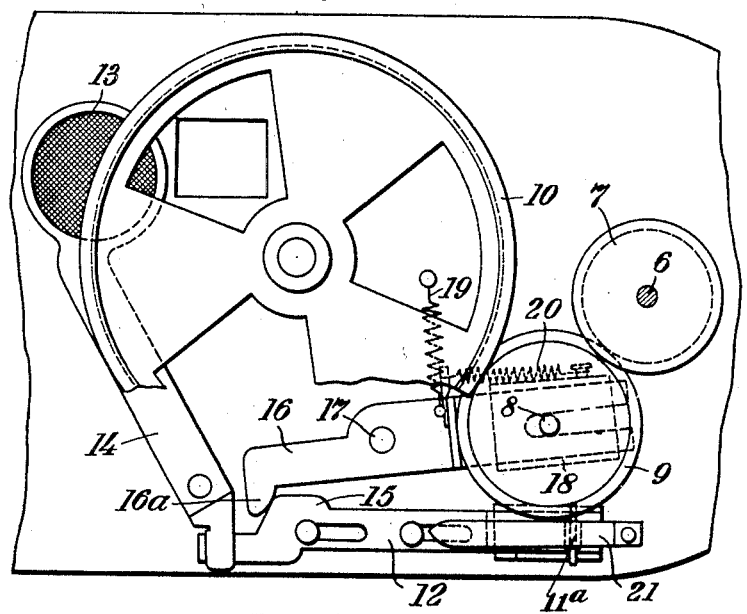
Figure 3:
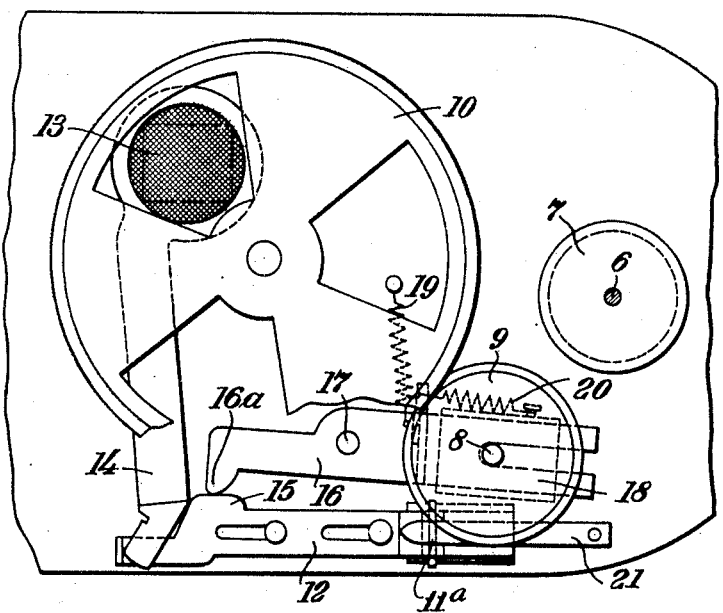
Figure 4:
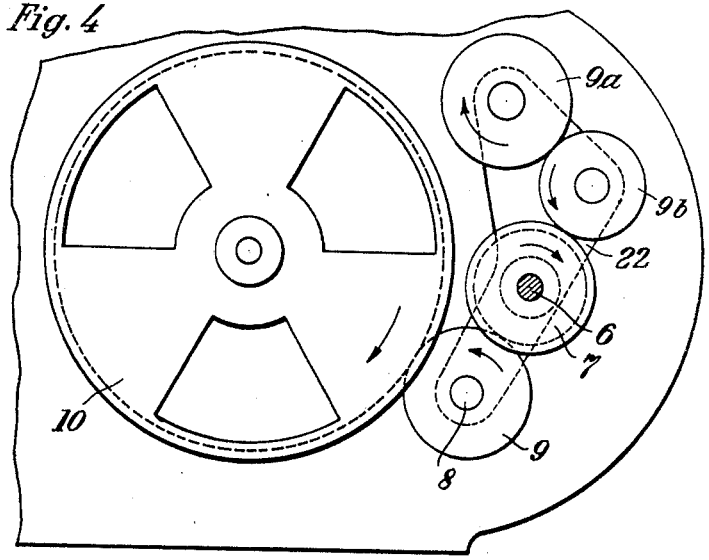
Figure 5:
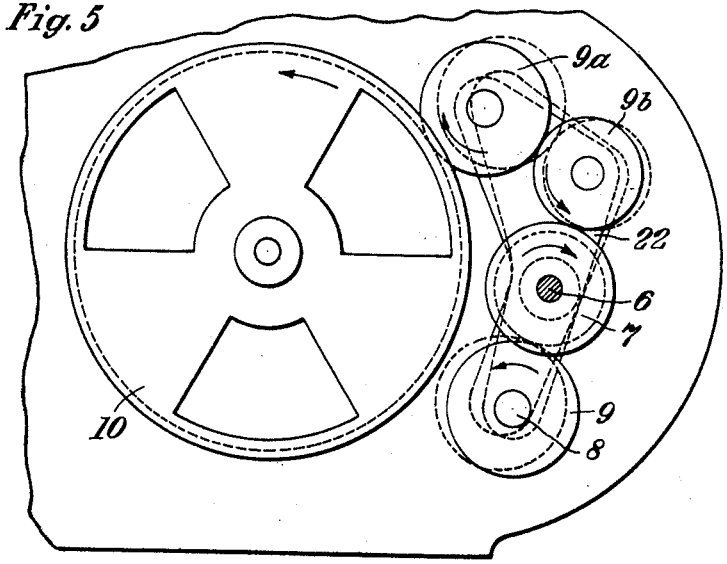

Two modes of carrying out the present invention are represented in the annexed drawings in which Fig. 1 is a plan view of a cinematographic apparatus according to our invention, part thereof being shown in section, Figs. 2 and 3 are sections on the line A—A of Fig. 1 when viewed in the direction of the arrows representing the friction disk in and out of operation, Figs. 4 and 5 represent another arrangement according to our invention.

In the cinematographic projector 1 the source of power is, for instance, an electric motor 2. 3 is the source of light, 4 are the optical elements and 10 is the shutter disk. On the driving shaft 6 of the electric motor 2 there is mounted a grooved disk 7. A friction disk 9 loosely mounted on the shaft 8 is provided between the driving disk 7 of the electric motor and the rotating shutter 10. A lever key switch 11 arranged outside the casing 1 is interconnected at its inner end 11a with a switch rod 12. By the rod 12 there is operated a fire protection flap 13 connected to the end of the double-armed lever 14. Furthermore a double armed lever 16 pivotally mounted at 17 is moved by a cam member 15 provided on the rod 12. The shaft 8 of the friction wheel 9 is placed in a link 18 movably mounted on the free end of the double-armed lever. The nose 16a provided on the lever 16 is kept in contact with the cam member 15 of the rod 12, by a spring 19, whereas the link 18 and at the same time the friction wheel 9 are drawn towards the rotary shutter by means of a spring 20. A leaf spring 21 serves to secure the lever key switch 11 in its two end positions.

The device illustrated in Figs. 2 and 3 works as follows:

In the position of the driving mechanism, indicated in Fig. 2, the friction wheel 9 is pressed, by the action of the springs 19 and 20, against the driving disk 7 as well as against the rotating shutter 10, so that the connection between the parts 7 and 10 is effected by a frictional grip and the rotating shutter is in driving connection with the source of power. The other parts of the mechanism, for instance, the grab and the feed drum, are in connection with the shaft bearing the rotating shutter. By placing the lever key switch in the position shown in Fig. 3, the rod 12 is displaced whereby the lever 14 with the fire protection flap 13 and the double armed lever 16 with the friction disk 9 are moved. Thus the friction disk 9 is removed from the driving disk 7 and the fire protection flap is intercalated in the path of rays of the cinematographic apparatus. The driving mechanism and the transporting means are disconnected from the source of power. The fire protection flap 13 prevents the film from being set on fire in stationary projection. When reversing the lever key switch 11, the elements return into the position indicated in Fig. 2, the driving mechanism of the cinematographic apparatus being again operated by the source of power.

In the arrangement represented in Figs. 4 and 5, instead of the rod 12 and the double-armed lever 16, a rocking lever 22 is pivotally mounted on the driving shaft 6. On the one side of this lever key switch there is mounted the friction wheel 9, while on the other side a friction wheel 9a is arranged together with an intermediate disk 9b. The rocking lever 22 may be operated by means of a button protruding out of the cinematographic projector, the rocking lever being secured in its different positions by means of well known stopping means, not represented.

The mode of operation of the device according to Figs. 4 and 5 is as follows:

If the rocking lever is in the position indicated in Fig. 4 the motion of the driving shaft 7 can be transmitted to the rotating shutter 10 by means of the friction disk 9, in the same manner as in the mechanism according to Figs. 3 and 4. If the lever key switch, however, is given the position indicated in dotted lines in Fig. 5, the friction disk 9 is removed from the rotating shutter 10 and the connection between the rotating shutter and the disk 9 effected by a frictional grip between these two parts is interrupted so that, though the motor is still running, the mechanism is stopped and the apparatus is adjusted for still projection. If the rocking lever takes the position indicated by the continuous lines in Fig. 5, the friction disk 9a comes into contact with the rotating shutter 10, so that, in consequence of the intermediate disk 9b, the direction of rotation of the shutter is changed. By these means still projection as well as rewinding of the film is possible. As in the devices according to the modes represented in Figs. 2, 3, 4, 5, and described the mechanism is actuated by a frictional gripping between the different parts of the mechanism, shocks which can possibly arise when reversing, are avoided without the provision of couplings or any kind of shock absorbers, which add to the costs of the apparatus.

What we claim is:

1. In a cinematographic apparatus in operative combination a power driven shaft, a rotating shutter, a friction wheel and means for bringing said friction wheel in and out of direct contact with said power driven shaft and said rotating shutter.

2. In a cinematographic apparatus in operative combination a power driven shaft, a rotating shutter, a double-armed lever rotatably mounted on said power driven shaft, friction wheels mounted on said lever and connected with said power driven shaft, and means for bringing said power driven friction wheels in and out of connection with said rotating shutter.

3. In a cinematographic apparatus in operative combination a power driven shaft, a rotating shutter, a double-armed lever rotatably mounted on said power driven shaft, two friction wheels on one arm of said lever in connection with each other and the power driven shaft, one friction wheel on the other arm of said lever and in connection with said power driven shaft and means for bringing the friction wheels on said arms in and out of connection with said rotating shutter.

4. In a cinematographic apparatus in operative combination a casing, a power driven shaft and a rotating shutter both mounted in said casing, a double-armed lever pivotally mounted on said casing one arm being provided with a nose and the other being provided with a slit, a friction wheel glidably mounted on the other arm of said lever by means of a shaft placed in a link, a spring fixed to said lever and said link and pressing said friction wheel against said rotating shutter, a rod and a lever key switch mounted on said casing, said rod being provided with slots engaging the one end of said lever key switch so that the same is moved on actuation of said lever key switch and with a cam, and a spring fixed to said lever and said casing, pressing said nose of said lever against said cam, so that on movement of the rod the lever is pivoted whereby the friction wheel is brought in and out of engagement with said rotating shutter.

5. In a cinematographic apparatus in operative combination a casing, a power driven shaft and a rotating shutter both mounted in said casing, a double-armed lever pivotally mounted on said casing, one arm being provided with a nose and the other being provided with a slit, a friction wheel glidably mounted on the other arm of said lever by means of shaft placed in a link, a spring fixed to said lever and said link and pressing said friction wheel against said rotating shutter, a rod and a lever key switch mounted on said casing, said rod being provided with slots engaging the one end of said lever key switch so that the same is moved on actuation of said lever key switch and with a cam, a spring fixed to said lever and said casing, pressing said nose of said lever against said cam, so that on movement of the rod the lever is pivoted whereby the friction wheel is brought in and out of engagement with said rotating shutter, and a fire protective flap pivotally mounted on said casing and hinged to said rod so that on moving said rod by said lever key, said flap is brought in and out of operation.

WILLY KADEN.
FERDINAND STIEFENHOFER.